United States Patent [19]
Allord

[11] Patent Number: 5,992,814
[45] Date of Patent: Nov. 30, 1999

[54] FISHING ROD BUTT SUPPORT

[76] Inventor: Charles E. Allord, 1543 10th St. Apt. 7, Santa Monica, Calif. 90401

[21] Appl. No.: 08/954,593

[22] Filed: Oct. 20, 1997

[51] Int. Cl.⁶ .................................................. A01K 97/10
[52] U.S. Cl. ...................... 248/535; 248/538; 248/316.7; 43/21.2; 224/200
[58] Field of Search ..................................... 248/535, 538, 248/314, 312.1, 316.7; 43/21.2; 224/269, 666, 199, 200, 669, 670, 191

[56] References Cited

U.S. PATENT DOCUMENTS

| | | | |
|---|---|---|---|
| 1,285,218 | 11/1918 | Kershaw | 248/516 |
| 2,068,054 | 1/1937 | Haislip | 224/200 |
| 2,546,280 | 3/1951 | Stein | 43/21.2 |
| 3,021,101 | 2/1962 | Gliebe | 248/532 |
| 3,885,721 | 5/1975 | Vanus | 224/200 |
| 3,907,182 | 9/1975 | Bryant | 224/670 |
| 3,982,675 | 9/1976 | Claypool | 224/666 |
| 5,105,574 | 4/1992 | Fast | 43/21.2 |
| 5,265,785 | 11/1993 | Chudy | 43/21.2 |
| 5,419,474 | 5/1995 | Marx et al. | 244/244 |
| 5,573,167 | 11/1996 | Bebb et al. | 224/666 |

*Primary Examiner*—Derek J. Berger
*Assistant Examiner*—Kimberly T. Wood
*Attorney, Agent, or Firm*—Charlie T. Moon

[57] ABSTRACT

A fishing rod butt support to hang by gravity from the waistband of clothing worn over the wearer's lower torso to bear against the lower belly portion and with depending planar front and back members hinged and hooked over the waistband, and a forwardly and upwardly opening socket carried by the front member for UP-Down and Side-Side hauling of the rod.

13 Claims, 2 Drawing Sheets

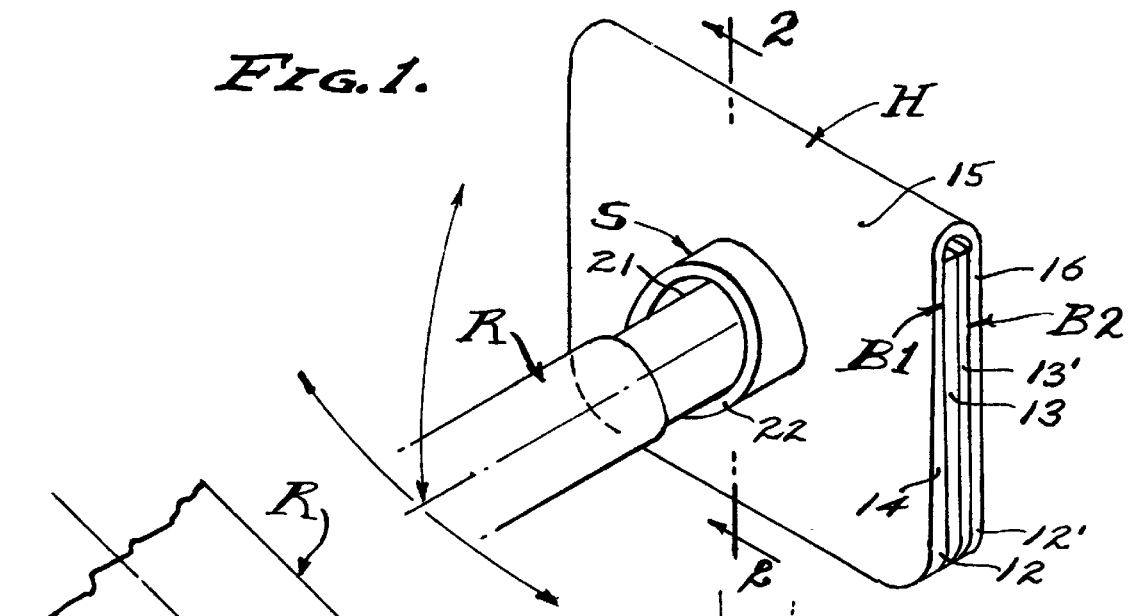
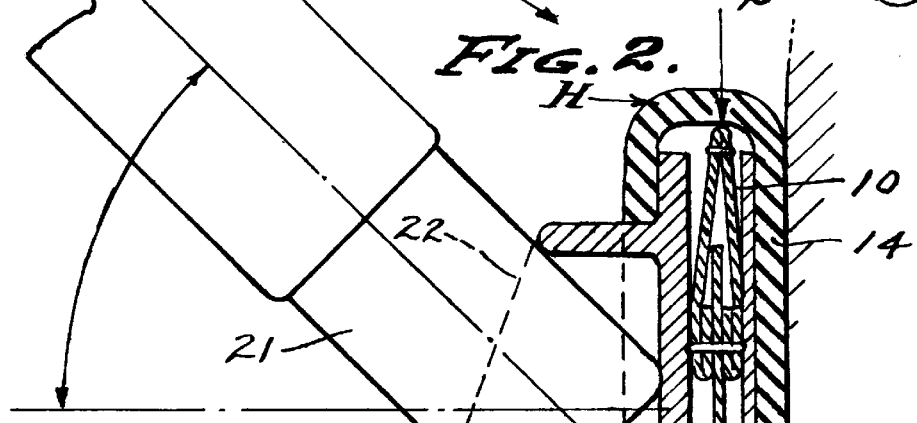
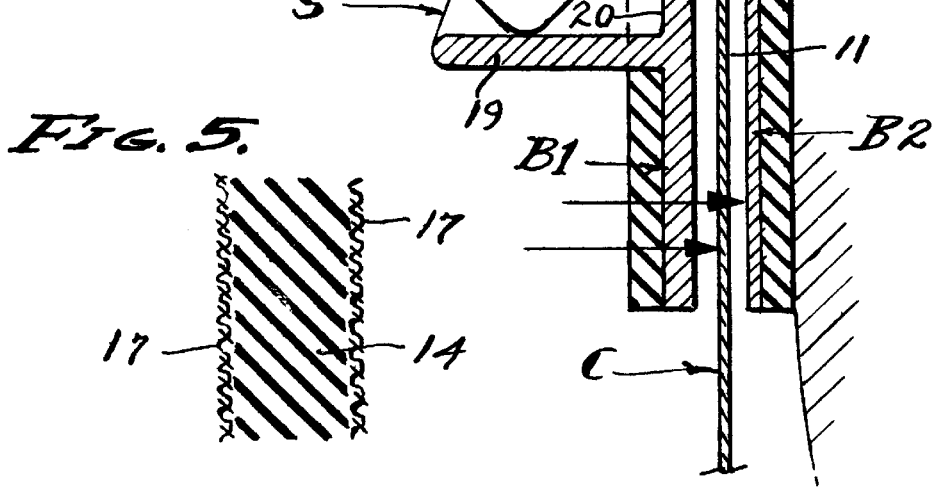

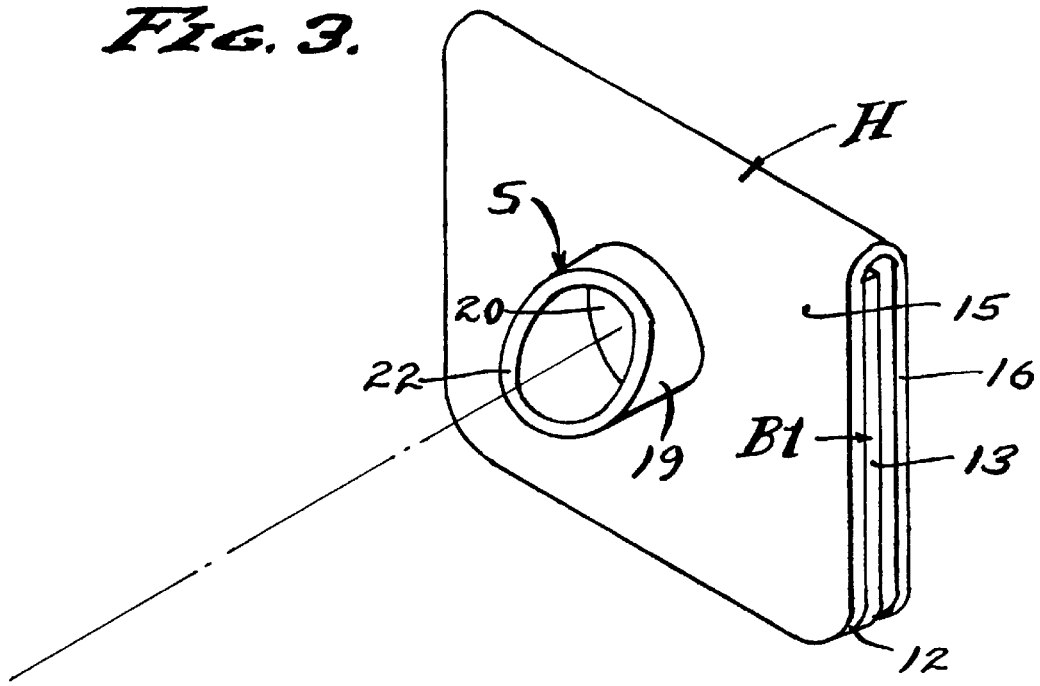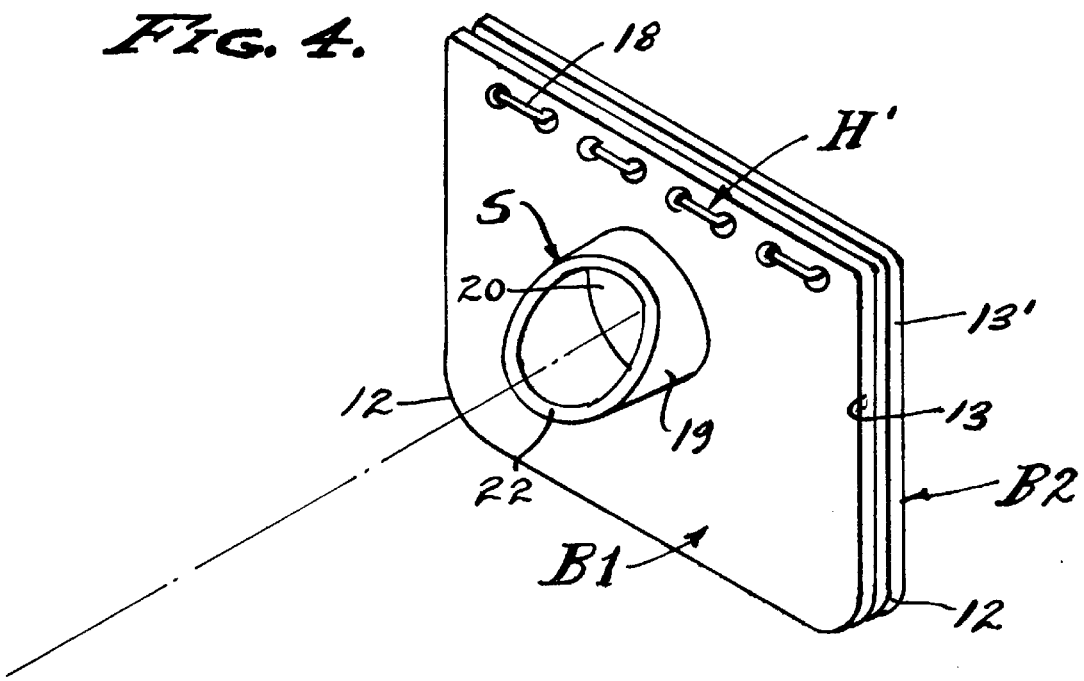

5,992,814

FISHING ROD BUTT SUPPORT

BACKGROUND OF THE INVENTION

This invention relates to the sport of fishing and especially game fishing with rod and reel, which requires a butt support for the fishing rod. State of the art fishing rod butt supports are characterized by adjustable belts that encircle the waist and hips of the fisherman. Also, adjustable shoulder straps are used. Typical fishing rod belts employ a gymbal-socket for securing the butt end of the fishing rod, the mounting of the gymbal-socket being in the form of a vertically widened substantially rigid base member extending transversely to the outside of the right and left hips of the fisherman. Said base member is permanentaly conformed to the general frontal curvature of the fisherman's body, but never exactly so (compound curvatures being neglected). Therefore, it is a general object of this invention to provide a Fishing Rod Butt Support that is not required to conform to the compound curvatures of the fisherman's body.

Fishing rod supports are applied to, or immediately below, the waistline of the wearer, and heretofore strapped into a contiguous position overlying the lower belly portion of said wearer. The aforesaid belting, or equivalent embracement, secures the aforesaid base member in position as by means of adjustable belt buckles, it being an object of this invention to eliminate belts and buckles, and to reduce the base member to a minimum planar size. Further, it is an object to avoid formation of the base member to the body contours of the wearer, both the vertical and transverse extent of the base member being minimized.

Heretofore fishing rod supports have been strapped onto the fisherman's body, in such a manner as to establish a solid and/or firm base for the gymbal-socket. That is, belts have strapped the base support to the body of the fisherman, rather however it is an object of this invention to secure the fishing rod support to the clothing of the fisherman wearing conventional pants, slacks or shorts and the like having a waistband leaving the upper torso bare, except as may be clothed with a shirt or blouse and the like. It is the waistband of the clothing covering the lower torso that is ever present, it being an object to advantageously employ the existant waist or waist band and/or belt of the lower torso clothing for support of the fishing rod support as herein disclosed.

In the event that a fisherman's lower torso clothing is too breif or flimsy for adequate support of this fishing rod support, then any ordinary belt associated with pants, slacks or shorts can be worn by the fisherman and to which the fishing rod support of the present invention is applied.

It is an object of this invention to provide a fishing rod support that is supported from the waist band or the like of clothing. In practice, the fishing rod suport is comprised of complementary front and back planar members joined or hinged at top edges thereof, and with a fishing rod socket fixed to the front member. In its preferred form the front member is substantially rigid so as to form a pad-like base onto which the fishing rod socket is integrally attached. And, the back member can be flexible, or it too is substantially rigid in its planar form. It is to be understood however that the degree of rigidity of either or both front and back members can be varied as circumstances require.

The foregoing and various other objects and features of this invention will be apparent and fully understood from the following detailed description of the typical preferred forms and applications thereof, throughout which description reference is made to the accompanying drawings.

THE DRAWINGS:

FIG. 1 is a perspective view of the butt support with a fishing rod butt received thereby, the fishing rod being in a down position.

FIG. 2 is an enlarged sectional view taken as indicated by line 2—2 on FIG. 1, the fishing rod being in an up position.

FIG. 3 is a view similar to FIG. 1 and shows a second embodiment of the support.

FIG. 4 is a view also similar to FIG. 1 and shows a third embodiment of the support.

And, FIG. 5 is an enlarged fragmentary sectional view of the support-hinge and padding material as used in the first and second embodiments.

PREFERRED EMBODIMENT:

Referring now to the drawings, The fishing rod R is supported upon the lower belly of the fisherman's torso without the use of belts or straps, the Fishing Rod Support being comprised generally of a front member B1 and a complementary back member B2 joined by and depending from a support-hinge H, and with a forwardly opening socket S carried by the front member B1. As shown in FIG. 1, the members B1 and B2 overlie the normally vertically disposed belly portion of the fisherman's torso so as to depend from his (or her) waistline. In carrying out this invention the members B1 and B2 hang from the fisherman's clothes C and specifically from the waistband 10 of the fisherman's pants, slacks or shorts 11. As shown, said front and back members hang over the front and back sides of the waistband by means of the fold of support-hinge H which bears upon the top edge or seam of said waistband, it being understood that there are numerous ways in which such waistbands are fabricated, which may or may not include belt loops (not shown). In practice, such clothing C is sewn together of supple and pliable fabric such as denim or the like, a fabric that establishes substantial support when drawn tight to the fisherman's torso.

Referring now to the first form and preferred embodiment of FIGS. 1 and 2 of the drawings, the front member B1 contiguously overlies the depending top margin of clothing C and its waistband 10. In practice, the member B1 is approximately one third of the width of the fisherman's waist, or about 5 inches wide. And, the member B1 is preferably rectangular, though it may be of other configurations, and about 4 inches high with well rounded lower corners 12 and edges 13. As shown, the member B1 forms a flat planar base that bears rearwardly through the clothing C and toward the fisherman's torso. The base member B1 is molded integrally with the socket S, of plastic material such as Acrylic Butyl Styrene (ABS) or like material.

Referring now to the preferred back member B2, said member contiguously underlies the depending top margin of the clothing C and its waistband 10 when in working position as shown in FIG. 2, to thereby bear against the belly surface of the finsherman's torso T. As shown, the member B2 forms a flat planar stiffener that ensures flatness and is complementary to the member B1 and is coextensively of the same configuration with well rounded corners 12' and edges 13'. The members B1 and B2 have mass so as to depend by gravity.

Referring now to the hinge means and support-hinge H, the members B1 and B2 are flexibly connected thereby so as to fold over the waistband 10 of clothing C, at least one of said two members being substantially rigid and preferably the base member B1 that carries the socket S. In the second embodiment of FIG. 3 the back member B2 is replaced with a back hinge member 16 of the same B2 configuration and formed of a supple and pliable sheet 14 of cushion material adapted to fold at least 180° with a front hinge member 15 to overlie the above described front member B1. In the first embodiment of FIGS. 1 and 2 the back hinge member 16 coextensively covers the back member B2. And, characteristically the hinge sheet 14 articulates along the adjacent top longitudinal edges of the members B1 and B2; and characteristically along the adjacent top horizontal edges of the hinge members 15 and 16 in both the first and second embodiments of FIGS. 1 and 3.

The support-hinge H folds and hooks over the top edge of the waistband 10 and in the first and second embodiments is formed of soft and supple pliant cushion material such as foamed Neoprene (tm) of substantial thickness. In carrying out this invention, the front member B1 and support-hinge member 15 are each approximately 0.187 inch thick, the back member B2 when employed being of lesser thickness such as 0.062 inch. The outside surfaces of the support-hinge material are preferably laminated with a reinforcing and/or decorative Nylon (tm) fabric 17 (see FIG. 5). A feature is the single opening cut through the member 15 to accommodate the socket S. The hinge sheet 14 material is secured coextensively to the outer surfaces of the members B1 and/or B2 by means of an adhesive or the like.

Referring now to the third embodiment of FIG. 4 of the drawings, the front and back members B1 and B2 are joined by a support-hinge H' confined to and extending between the top horizontal marginal portions of said members B1 and B2. As shown, there is a loose lacing of cord 18 strung through aligned openings along the top margins of members B1 and B2, permitting the two rigid members to swing relative to each other.

The socket S is centered on and projects from the front face of the front member B1 and is in the form of a front opening cylinder 19 with a bottom 20 at the plane of the member B1. As clearly shown in FIG. 2, the inside diameter of the socket cylinder is larger than the outside diameter of the fishing pole butt 21, thereby permitting omni directional articulation of said pole P with respect to the plane of the member B1. The open front end 22 of the socket cylinder 19 is truncated upwardly and rearwardly as shown so as to provide support and clearance to permit upward as well as side to side hauling of the fishing pole P.

The Fishing Pole Butt Support hereinabove disclosed is small enough to be transported in a fisherman's large pocket or tackle box, and is devoid of interfering protuberances. This support device is readily installed in working position without time consuming preparation, and inherently falls into place by gravity subject to continuous adjustment by forces applied, being secured in position by frictional engagement, and with the socket S ever-ready to receive the butt 21 of the fishing pole P. There are no belts or straps and no fasteners or buckles, this support device being secured in place by virtue of gravity and interface frictional engagement with the clothing C, and the support-hinge H providing a soft cushion for comfort and protection against torso bruising.

Having described only the preferred forms and applications of my invention, I do not wish to be limited or restricted to the specific details herein set forth, but wish to reserve to myself any modifications or variations that may appear to those skilled in the art as set forth within the limits of the following claims.

I claim:

1. A rod butt support for hanging from a waistband of clothing so as to bear against a lower belly portion of a wearer, and including;

a rigid front member of a substantial size and shape to bear against a front side of said waistband and over said lower belly portion of the wearer, a rigid back member of a size and shape complementary to the front member for underlying a back side of said waistband to bear against said lower belly portion of the wearer, a support-hinge means of flexible sheet material at least joining top marginal edges of the front and back members and forming a fold to hook over a top edge of said waistband, and a forwardly opening outwardly projecting rigid socket carried by the front member adapted to receive a rod butt.

2. The rod butt support as set forth in claim 1, wherein the front member is a planar base member having substantial width and height to bear through the clothing of the wearer.

3. The rod butt support as set forth in claim 1, wherein the back member is a planar stiffener member having substantial width and height to bear against the lower belly portion of the wearer.

4. The rod butt support as set forth in claim 1, wherein the front member is a planar base member having substantial width and height to bear against the clothing of the wearer, and wherein the back member coextensively underlies the front member to bear against the lower belly portion of the wearer.

5. The rod butt support as set forth in claim 1, wherein the mass of the front and back members depends by gravity from the support-hinge.

6. The rod butt support as set forth in claim 1, wherein the support-hinge means is a sheet of cushion material to bear against the lower belly portion of the wearer.

7. The rod butt support as set forth in claim 3, wherein the support-hinge means includes a sheet of cushion material overlying the back member to bear against the lower belly portion of the wearer.

8. The rod butt suport as set forth in claim 1, wherein said front and back members having outer surfaces and the support-hinge is flexible sheet material joining and overlying the outer surfaces of the front and back members.

9. The rod butt support as set forth in claim 1, wherein said front and back members having outer surfaces and the support-hinge is flexible material joining and overlying the outer surfaces of the front and back members, at least one side of said flexible material being laminated with a reinforcing fabric.

10. The rod butt support as set forth in claim 1, wherein the forwardly opening socket is comprised of a front opening cylinder for receiving the rod butt.

11. The rod butt support as set forth in claim 1, wherein the said forwardly opening socket is comprised of a front opening adapted to be larger in diameter than the configuration of the rod butt.

12. The rod butt support as set forth in claim 1, wherein the forwardly opening socket is comprised of a front opening cylinder adapted to be larger in diameter than the rod butt configuration, and a front open end of the cylinder truncated upwardly and rearwardly to permit upward hauling of the rod.

13. A fishing rod butt support member for securement to a waistband of clothing so as to bear against a lower abdomen of a wearer of said member and comprising:

a flexible, conformable sheet of material having secured to a back thereof, spaced first surfaces of relatively rigid first and second plates of complementary size and shape to cover a substantial portion of the lower abdomen of the wearer thereby forming a foldable hinge therebetween to hook over a top edge of said waistband, opposite surfaces of said plates being adapted to secure therebetween said waistband, one of said plates having a forwardly opening rigid socket projecting outwardly therefrom and through said flexible, conformable sheet of material and adapted to receive in said socket a rod butt of a fishing rod.

* * * * *